2,878,193

PREPARATION OF IRON GROUP HYDROGENATION CATALYST SUPPORT ON MOLYBDENUM OXIDE-ALUMINA SUPPORT

John W. Scott, Jr., Ross, Calif., assignor to California Research Corporation, San Francisco, Calif., a corporation of Delaware No Drawing. Application October 26, 1955
Serial No. 543,003

2 Claims. (Cl. 252—465)

This invention relates to an improved hydrogenation process for the treatment of petroleum stocks primarily for the reduction of the content of nitrogen and sulfur compounds therein, the process being conducted in the presence of a novel catalyst comprising cobalt oxide on a support of molybdenum oxide and alumina formed by coprecipitation, with subsequent drying and calcining, from a solution containing a combustible organic material of relatively high molecular weight.

It is an object of this invention to provide a catalyst which is effective for use in a variety of hydrogenation-refining type operations encountered in the petroleum refining and petro-chemical industries, and which has high activity and thermal stability permitting the catalyst to be employed at mild operating conditions resulting in improved process selectivity, long, useful catalyst life and low operating costs. A more particular object is to provide a catalyst of this character which can be employed in the processing of a wide variety of distillate stocks ranging from light naphthas to heavy fuel oils, together with an improved catalytic process whereby, under suitable conditions of operation and of hydrogen supply, there are obtained efficient selective hydrogenation of nitrogen, sulfur and oxygen compounds; saturation of any olefinic, diolefinic and acetylinic compounds present; removal of color bodies; and stabilization of the product against polymeric or oxidative deterioration in subsequent storage and service. The nature of other objects will be apparent from a consideration of the descriptive portion to follow.

The present invention is based on the discovery that the foregoing objects are attained when the desired hydrogenation treatment is conducted by contacting the petroleum stock, at a space rate of from about 1 to 8 v./v./hr., a temperature of about 650 to 850° F., and a pressure from 200 to 1200 p. s. i. g., with from about 500 to 8000 s. c. f. $H_2$ per barrel of feed in the presence of a catalyst comprising from about 1 to 6% by weight cobalt oxide deposited on a highly porous alumina-molybdenum oxide support formed by coprecipitation in the presence of a dispersion of an organic additive of relatively high molecular weight, the coprecipitate being dried and calcined before being impregnated with a solution of a cobalt salt and thereafter finally dried and calcined.

As indicated above, the described cobalt oxide-alumina-molybdenum oxide catalyst can be employed, in accordance with the present invention, in the hydrogenation of a wide variety of petroleum stocks. More particularly, good results are obtained in the hydrogen treating of straight run and cracked naphthas as feed purification for subsequent catalytic processing. This application is of increasing interest in petroleum refining because of the continuing demand for higher octane, better quality motor fuels, and because of the increasing use of reforming processes involving platinum or other catalysts which require very low sulfur and nitrogen content feeds. It is also useful in the hydrogen treating of straight run or cracked naphtha distillates to be employed in the manufacture of specialty naphthas, sovlents, thinners and other products where rigorous specifications on sulfur, nitrogen, odor, color and stability must be met. The process is employed with good results in the hydrogen treating of high boiling cracked or straight run distillate stocks such as gas oils and the like, as pretreatment for subsequent catalytic processing. Such pretreatment will reduce both basic nitrogen and sulfur contents of the feed and thus provide higher activity and selectivity in the ensuing cracking operation, with resultant increases in yield and quality of the gasoline product. It should also be noted that the catalyst can be employed with good results in the hydrogenation of lubricating oil stocks as a replacement for acid treating or as a finishing step to insure uniformity of base stocks prepared by extraction. This treatment reduces sulfur and carbon residue, while improving color, acid value, viscosity index and additive response.

In preparing the catalyst of this invention the first step is to coprecipitate the alumina and molybdenum oxide from a solution containing a dispersion of a high molecular weight organic component along with appropriate compounds of aluminum and molybdenum. As a source of the aluminum component there can be employed any salt such as aluminum chloride, either hydrated or anhydrous, aluminum acetate or aluminum nitrate, while suitable molybdenum components are compounds such as ammonium molybdate, ammonium dimolybdate or ammonium heptamolybdate. If these ammonium salts are not available as such, they can be prepared by dissolving either molybdic acid or molybdic anhydride in the appropriate quantity of aqueous ammonia. As the organic component, there is employed from about 3 to 30% by weight, based on the combined anhydrous oxide (alumina and molybdenum oxide) content of the catalyst, of a dispersion of a high molecular weight organic material such as the various animal and vegetable proteins, cellulosic materials and derivatives thereof, high molecular weight carbohydrates, alcohols and their esters and rubber lattices, this dispersion being either physical or molecular, as in the case of colloids, suspensions and solutions. The organic component, which has a molecular weight falling within the range of from about $1 \times 10^3$ to $1 \times 10^7$, is present within the range indicated above, but in an amount insufficient in and of itself to set up into a gel structure during the precipitation of the inorganic hydrogel, it being of particular importance to maintain the organic material uniformly distributed as the internal phase during the coprecipitation step and to avoid organic gel formation when employing gel-forming organic components.

Having selected the desired components, precipitation of the crude catalyst material is effected by mixing the aluminum- and the molybdenum-containing solutions (along with the dispersion of the organic component) in the proportions to give the desired percentages of molybdenum and alumina in the finished catalyst, and by thereafter adding to the mixture a solution of aqueous ammonia until precipitation is complete, it also being possible to employ the reverse order of addition. Again, satisfactory results can be obtained by first mixing the ammonia and the molybdenum oxide salt solutions and then adding a solution of the aluminum salt. Still other methods for effecting the desired coprecipitation of the alumina and molybdenum components will suggest themselves to those skilled in the art. Satisfactory catalysts for the purpose of this invention contain from 6 to 20% molybdenum oxide and 75 to 90% alumina, with the balance being normally comprised of cobalt oxide (1 to 6%).

Following the coprecipitation step, the coprecipitate (which contains the organic component distrubuted uniformly therein) is washed and then dried at a temperature above about 150° F. which is below the temperature at which substantial decomposition of the organic material occurs, but is sufficient to establish the lattice structure of the inorganic oxide coprecipitate and to prevent formation of an organic gel structure while said inorganic lattice is being established, particularly suitable drying temperatures being from about 200 to 300° F. as a general rule.

Following the drying step, the product is calcined to decompose the organic material, the calcining step normally being effected at temperatures of from about 1050 to 1400° for several hours, the particular temperature employed being somewhat dependent upon the nature of the organic component present. If desired, the dried material may be ground and pelleted (preferably along with several percent of a graphite lubricant) before being subjected to the calcining step.

Following the calcination of the catalyst, the latter is impregnated with an aqueous solution of a cobalt salt such as cobalt sulfate, cobalt nitrate, cobalt chloride, cobalt acetate or the like, the strength of the solution being such as to supply the catalyst with the desired quantity of the cobalt component. The resulting impregnated product is then subjected to a final drying and calcining step so as to convert the cobalt material into the corresponding oxide. If not previously shaped into the desired form, the catalyst may now be ground and pelleted, either with or without the addition of a minor percentage of graphite, as indicated above.

The fact that both the cobalt oxide of the catalyst, as well as the organic additive component employed in the coprecipitation step, are essential to a successful practice of this invention is indicated by the data presented in Examples I and II to follow.

EXAMPLE I

In this operation a catalyst containing 12% molybdenum oxide, 3.5% cobalt oxide and 84.5% alumina is prepared by dissolving 70 grams of brown flake animal glue having a molecular weight of approximately 60,000 in one liter of hot water. This solution is added to eight liters of dilute aluminum chloride solution containing the equivalent of 600 grams of anhydrous alumina. Molybdenum oxide ($MoO_3$) in the amount of approximately 94 grams is then dissolved in one liter of dilute ammonium hydroxide and added to the glue solution with stirring, followed by two liters of concentrated ammonium hydroxide diluted with two liters of water. Complete precipitation of the $MoO_3$—$Al_2O_3$ results, following which the thick slurry is repulped, adjusted to a pH of 7 and filtered. At the time of coprecipitation, the glue concentration is approximately 0.5 weight percent, an amount insufficient to result in coagulation or organic gel formation, and the $MoO_3$—$Al_2O_3$ concentration is slightly more than five percent. The filter cake is then partially dried and then repulped to 14 liters with water, after which it is filtered three times for removal of most of the aluminum chloride. The filter cake is then placed in a drying oven at 210° F. for 48 hours to permit setting of the gel structure. The dried cake is then ground and pelleted by compression into 3/16 inch pellets, using 4% of graphite as a lubricant. The pelleted catalyst is then calcined by heating slowly in air in 1180° F. and then holding the same at this temperature for four hours to insure complete oxidation and removal of the organic additive. The calcined catalyst is then impregnated with an aqueous solution of cobalt sulfate containing the latter salt in an amount sufficient to result in a finished catalyst containing 3.50% by weight cobalt oxide, following which the pellets are again dried at 210° F. and calcined at 1180° F. for four hours to supply the finished catalyst.

In a companion operation, the same procedure is followed except that the glue component is omitted. This catalyst had a bulk density of 1.2 grams/cc. as compared with a value of 1.0 for the catalyst prepared with the glue.

Comparative tests of the two catalysts were then made in which identical cracked naphtha feed stocks (boiling between 303 and 430° F., and containing 360 p. p. m. of basic nitrogen and 7500 p. p. m. of sulfur) were passed through equal volumes of the respective catalysts at a temperature of 750° F. and pressure of 800 p. s. i. g., along with 3000 s. c. f. or recycle gas (containing about 90% hydrogen) per barrel of feed, the feed rate being approximately 1.6 v./v./hr. Under these conditions, the product obtained contained but 1.0 p. p. m. of basic nitrogen in the case of the catalyst prepared with the glue additive, whereas with the other catalyst the product contained 8 p. p. m. of basic nitrogen. Similarly, the effluent from the catalyst prepared in the presence of the glue dispersion contained but 9 p. p. m. sulfur, whereas the product from the other catalyst contained 21 p. p. m. sulfur.

EXAMPLE II

In this operation a catalyst is prepared with a glue component in the same fashion as described in Example I above, except that the final product contained 3.7% cobalt oxide instead of 3.5% thereof. In a companion operation, a similar catalyst was prepared but without the addition of any cobalt oxide component. The catalysts were then compared by passing identical Arabian gas oil feeds (boiling between 450 and 650° F. and containing 0.9% sulfur) through the respective catalysts at a temperature of 750° F. and pressure of 250 p. s. i. g., using 1000 s. c. f. of hydrogen recycle gas (90% $H_2$) per barrel of feed, at a space rate of 2 v./v./hr. The product obtained using the catalyst prepared with cobalt oxide contained but 0.2% sulfur, whereas that from the non-cobalt oxide-containing catalyst had a sulfur content of 0.45%.

In further illustration of the utility of the present catalyst and of various novel hydrogenation processes employing the same, there are presented in Tables II and III below data obtained in the catalytic hydrogenation of a wide variety of feed stocks, the catalyst employed in each run having the properties given in Table I below and having been prepared in a fashion similar to that described in Example I above wherein glue was present.

*Table I*

Chemical Composition (moisture-free), weight percent:

| | |
|---|---|
| CoO | 3.7 |
| $MoO_3$ | 12.1 |
| Cl | 0.05 |
| $Fe_2O_3$ | 0.11 |
| $Na_2O$ | 0.04 |
| C (graphite) | 1–2 |
| $H_2O$ (as received) | 1 |

Physical properties:

| | |
|---|---|
| Pellet size, inches | 3/16 |
| Surface area, ($N_2$), m.²/g. | 143 |
| Bulk density, gm./ml. | 1.02 |
| Crushing strength, lb., flat plate method | 43 |
| Crushing srength, lb.[1] | 30 |

[1] Load applied parallel to cylindrical axis with 60° cone, truncated to 0.020 inch, bearing on end of pellet. Average 50 pellets.

Table II.—Example data—CoMo hydrogenation catalyst—Hydrogenation of cracked and straight run naphthas for sulfur and nitrogen removal

| Feed stock, number | CB-533 | CB-534 | CB-559 | | | | C-2233 | C-2241 | CB-586 | CB-587 | CB-494 |
|---|---|---|---|---|---|---|---|---|---|---|---|
| Feed stock, identification | Blend of thermal, cat. cracked and straight run naphthas from California crudes | | | | | | Coker dist. from high nitrogen cont. crude | Blend of high nitrogen coker distillate and straight run naphthas | Straight run mid-cont. naph-tha | Blend of straight run and W. Tex. coker dist. naphthas | Cat. cracked Arabian naph-tha |
| | Full boiling range | Light | Heavy | | | | | | | | |
| Feed inspections: | | | | | | | | | | | |
| Gravity, °API | 45.0 | 50.7 | 39.3 | | | | 52.7 | 51.4 | 55.7 | 55.4 | 33.8 |
| Aniline point, °F | 84 | 89 | 88 | | | | 116 | | 136 | 113 | 38 |
| Bromine number | 47 | 56 | 38 | | | | 63 | | 1 | 34 | 23 |
| Nitrogen, p. p. m | 200 | 73 | 448 | | | | 2,610 | 1,300 | 5 | 40 | 207 |
| Sulfur, weight percent | 0.64 | 0.56 | 0.71 | | | | 0.16 | | 0.02 | 0.51 | 0.34 |
| ASTM dist., °F.: | | | | | | | | | | | |
| St | 200 | 198 | 316 | | | | 141 | 180 | 194 | 131 | 301 |
| 10 | 251 | 236 | 333 | | | | 243 | 273 | 236 | 217 | 335 |
| 30 | 280 | 255 | 349 | | | | 282 | 306 | 258 | 236 | 358 |
| 50 | 309 | 270 | 363 | | | | 308 | 326 | 278 | 266 | 377 |
| 70 | 339 | 286 | 384 | | | | 332 | 346 | 300 | 302 | 394 |
| 90 | 378 | 304 | 413 | | | | 376 | 375 | 326 | 363 | 414 |
| E. P | 416 | 330 | 436 | | | | 435 | 421 | 366 | 434 | 441 |
| Operating conditions: | | | | | | | | | | | |
| Catalyst size, in | 3/16 | 3/16 | 3/16 | 3/16 | 3/16 | 1/8 | [1] 5-8 | [1] 5-8 | 3/16 | 3/16 | 1/8 |
| Space rate, v./v./hr | 2.0 | 2.0 | 1.0 | 2.0 | 4.0 | 2.0 | 1.0 | 1.0 | 2.0 | 4.0 | 4.0 | 2.8 |
| Temperature, °F | 750 | 750 | 780 | 780 | 780 | 780 | 780 | 780 | 780 | 780 | 770 | 750 | 740 |
| Pressure, p. s. i. g | 800 | 800 | 800 | 800 | 800 | 800 | 800 | 800 | 800 | 800 | 800 | 800 | 700 |
| Gas recycle, s. c. f., bbl | 3,000 | 3,000 | 3,000 | 3,000 | 3,000 | 3,000 | 3,400 | 3,100 | 3,100 | 3,200 | 3,000 | 3,000 | 6,000 |
| Product inspections: | | | | | | | | | | | |
| Gravity, °API | 48.1 | 53.7 | 41.8 | 41.7 | 41.8 | 42.5 | 56.2 | 56.1 | 53.2 | 53.0 | 55.9 | 55.4 | 36.1 |
| Aniline point, °F | 108 | 116 | 105 | 105 | 105 | | 143 | 143 | 140 | 141 | | | 54 |
| Bromine number | 1 | 1 | | 1 | 1 | 6 | | | | | | | 3 |
| Nitrogen, p. p. m | 1 | 1 | 2 | 6 | 125 | 3 | 3 | 170 | 1 | 15 | Nil | 1 | 1 |
| Sulfur, weight percent | 0.01 | 0.01 | 0 | 0 | 0.01 | 0 | | | | | 0 | 0 | 0.005 |
| Nitrogen reduction, percent | 99.5 | 98.7 | 99.5 | 98.6 | 72.0 | 99.3 | 99.9 | 93.5 | 99.9 | 98.8 | 100 | 97.5+ | 99.5+ |
| Sulfur reduction, percent | 98.5 | 98.2 | 100 | 100 | 98.6 | 100 | | | | | 100 | 100 | 98.5 |

[1] Mesh.

Note.—Liquid yields 99+ volume percent on straight run stocks, 100+ volume percent on cracked stocks. Hydrogen consumption nearly theoretical based on "N" and "S" reduction and olefin saturation. Product distillation same as feed.

Table III.—Example data—CoMo hydrogenation catalyst—Hydrogenation of straight run and cracked heavy distillate for sulfur removal

| Feed stock, number | CB-437 | | | CB-352 | | |
|---|---|---|---|---|---|---|
| Feed stock, identification | Arabian gas oil, 450°-650° F., straight run distillate | | | Coker distillate from high sulfur crude | | |
| Feed inspections: | | | | | | |
| Gravity, °API | 37.0 | | | 27.4 | | |
| Aniline point, °F | 166 | | | 122 | | |
| Bromine number | | | | 1,500 | | |
| Nitrogen, p. p. m | | | | | | |
| Sulfur, weight percent | 0.90 | | | 3.07 | | |
| ASTM distillation, °F.: | | | | | | |
| St | 451 | | | 200 | | |
| 10 | 502 | | | 360 | | |
| 30 | 529 | | | 510 | | |
| 50 | 552 | | | 608 | | |
| 70 | 577 | | | 690 | | |
| 90 | 618 | | | 700 at 75% | | |
| E. P | 657 | | | 858 at 95% (D-1158) | | |
| Operating conditions: | | | | | | |
| Catalyst size, in | [1] 6-12 | 1/8 | 3/16 | [1] 8-14 | [1] 8-14 | [1] 8-14 |
| Space rate, v./v./hr | 2.0 | 2.0 | 2.0 | 5.0 | 5.0 | 8.0 |
| Temperature, °F | 750 | 750 | 750 | 720 | 720 | 720 |
| Pressure, p. s. i. g | 250 | 250 | 250 | 800 | 250 | 800 |
| Gas recycle, s. c. f./bbl | 1,000 | 1,000 | 1,000 | 2,000 | 1,000 | 1,000 |
| Product inspections: | | | | | | |
| Gravity, °API | | 38.4 | 37.7 | 33.1 | 31.5 | 32.2 |
| Aniline point, °F | | | | 180 | 170 | 178 |
| Bromine number | | | | | | |
| Nitrogen, p. p. m | | | | | | |
| Sulfur, weight percent | 0.07 | 0.14 | 0.20 | 0.19 | 1.12 | 0.52 |
| Nitrogen reduction, percent | | | | | | |
| Sulfur reduction, percent | 92.3 | 84.5 | 77.8 | 93.9 | 63.6 | 83.1 |

[1] Mesh.

Note.—Liquid yields 99+ volume percent on straight run stocks, 100+ volume percent on cracked stocks. Hydrogen consumption nearly theoretical based on "N" and "S" reduction and olefin saturation. Product distillation same as feed.

In all of the operations described in Tables II and III above it is possible to maintain the catalyst in an active condition for relatively long on-stream periods. When the catalyst activity does fall off, however, regeneration can be effected in rapid fashion and at higher temperatures than can be employed with many other catalysts without loss of activity. This stems from the fact that the present catalyst is one of inherently high thermal stability. Thus, by employing regeneration gases having a relatively high oxygen content, with ensuing above normal regeneration temperatures, it is possible to make an appreciable reduction in the length of the regeneration period with a corresponding increase in the useful, on-stream time of the catalyst.

At plant start-up proper operating procedure calls for the use of an unreactive atmosphere of inert or recycle gas in bringing the catalyst up to reaction temperature. Use of an atmosphere of air alone under pressure could involve catalyst overheating from the combustion of carbon or the chance presence of some extraneous matter in the reactor. Before each catalyst regeneration, inert gas is used to purge the catalyst. Feed tanks are also blanketed with inert gas since oxygen was found responsible for deposit of solid reaction products in the feed heat exchangers. For this purpose, inert gas, controlled to 0.2% to 0.3% maximum may be generated by the combustion of methane or some other fuel. The gas is cooled to condense any water, thus insuring a low gas dewpoint which is essential. Sulfur content of the gas must also be kept to a minimum to avoid corrosion from sulfur dioxide. Catalyst regeneration is preferably carried out with a mixture of inert gas and air controlled to 1.0%±0.5% oxygen, at about 800° F. inlet temperature and keeping the maximum catalyst temperature below 1050° F.

Carbonaceous deposits are virtually eliminated in most applications by the maintenance of a high partial pressure of hydrogen during the on-stream period, which suppresses certain coke-forming reactions. A high hydrogen partial pressure is maintained by recycle of process gas with addition of outside hydrogen as required.

It has been observed that the activity of the catalysts of the present invention is impaired if the hydrogen-containing recycle or other gaseous stream admixed with the incoming feed to the catalyst contains appreciable quantities of carbon monoxide. Thus, the presence of but one percent of carbon monoxide in a typical hydrogen-rich recycle stream reduces the activity of the catalyst by approximately 50%. Accordingly, it forms a feature of the present invention to employ as the source of hydrogen to the catalyst a gaseous stream which contains less than one percent carbon monoxide, and preferably less than 0.1%, these percentages being on a volume basis. Methods for reducing the carbon monoxide content of gases are well known in the art and need not be described here.

I claim:

1. A hydrogenation catalyst comprising from about 1 to 6 weight percent cobalt oxide, and as a support therefor, from about 6 to 20 weight percent molybdenum oxide and 75 to 90 weight percent alumina, said support being formed by coprecipitation, with subsequent drying and calcining to remove combustible matter, from a solution of aluminum and molybdenum salts containing a dispersion of a combustible organic material having a molecular weight of from about $1 \times 10^3$ to $1 \times 10^7$, said organic material being present in an amount of from about 3 to 30 percent, based on the combined anhydrous oxide content of the solution, but insufficient to set up into a gel structure during the coprecipitation of alumina and molybdenum oxide.

2. The catalyst of claim 1 wherein the organic material is animal glue.

References Cited in the file of this patent

UNITED STATES PATENTS

| | | |
|---|---|---|
| 2,211,208 | Ipatieff et al. | Aug. 13, 1940 |
| 2,547,380 | Fleck | Apr. 3, 1951 |
| 2,554,597 | Stearns et al. | May 29, 1951 |
| 2,603,610 | Amos et al. | July 15, 1952 |
| 2,697,066 | Sieg | Dec. 14, 1954 |
| 2,717,861 | Baumgarten et al. | Sept. 13, 1955 |
| 2,722,540 | Fleck | Nov. 1, 1955 |
| 2,728,710 | Hendricks | Dec. 27, 1955 |
| 2,733,189 | Gilbert et al. | Jan. 31, 1956 |
| 2,799,661 | De Rosset | July 16, 1957 |